United States Patent Office 3,453,261
Patented July 1, 1969

3,453,261
PROCESS FOR THE PREPARATION OF WATER-SOLUBLE METHYL HYDROXYPROPYL ETHERS OF CELLULOSE
Werner Scherff, Dusseldorf-Holthausen, Germany, assignor to Henkel & Cie, G.m.b.H., Dusseldorf-Holthausen, Germany, a corporation of Germany
No Drawing. Filed Oct. 13, 1965, Ser. No. 495,683
Claims priority, application Germany, Nov. 28, 1964, H 54,415
Int. Cl. C08b 11/08, 21/24; C09j 3/04
U.S. Cl. 260—231
9 Claims

ABSTRACT OF THE DISCLOSURE

This invention relates to a process for the preparation of a methyl hydroxypropyl ether of celluose which is readily soluble in water which comprises the steps of reacting sodium cellulose, having a weight ratio of air-dry cellulose to sodium hydroxide of between about 1 to 0.5 and 1 to 0.9 simultaneously with propylene oxide and liquid methyl chloride, said propylene oxide being utilized in a weight ratio of air-dry cellulose to propylene oxide of about 1 to 0.02 and 1 to 0.15 and said liquid methyl chloride being utilized in a weight ratio of at least 4 parts for 1 part of air-dry cellulose, under pressure sufficient to maintain said liquid methyl chloride at a temperature of between about 40° C. and 100° C., removing the excess methyl chloride and recovering said methyl hydroxypropyl ether of cellulose.

THE PRIOR ART

It is well known to prepare methyl hydroxypropyl ethers of cellulose by reacting propylene oxide and methyl chloride with alkali cellulose. For this purpose 0.45 to 0.8 part of propylene oxide and 1.1 to 2.0 parts of methyl chloride to 1 part by weight of cellulose are used as described in United States Patent No. 2,831,852. In this manner, however, mixed cellulose ethers are obtained which dissolve only relatively poorly in water.

Furthermore it is known that methyl ethers and methyl hydroxyethyl ethers of cellulose with otherwise satisfactory water-solubility become, on the introduction of the powdery or granular products into water, superficially coated with a gel of viscous to solid texture, which renders the further penetration of water, and therewith the dissolving process, difficult. Consequently, the cellulose ethers previously reported are apt to form lumps when they are dissolved in water. It is also a known fact that this disadvantage, which causes a considerable loss of time at the dissolving process, can be eliminated by treating the water-soluble cellulose ethers with glyoxal (German Patent 1,051,836). This treatment, however, calls for additional operation steps in the preparation of the cellulose ethers.

It is an object of the present invention to develop a process for the preparation of a methyl hydroxypropyl ether of cellulose which is readily soluble in water which comprises the steps of reacting sodium cellulose, having a weight ratio of air-dry cellulose to sodium hydroxide of between about 1 to 0.5 and 1 to 0.9 simultaneously with propylene oxide and liquid methyl chloride, said propylene oxide being utilized in a weight ratio of air-dry cellulose to propylene oxide of about 1 to 0.02 and 1 to 0.15 and said liquid methyl chloride being utilized in a weight ratio of at least 4 parts for 1 part of air-dry cellulose, under pressure sufficient to maintain said liquid methyl chloride at a temperature of between about 40° C. and 100° C., removing the excess methyl chloride and recovering said methyl hydroxypropyl ether of cellulose.

A further object of the invention is the obtention of a water-soluble methyl hydroxypropyl ether of cellulose prepared from the reaction of a sodium cellulose having a weight ratio of air-dry cellulose to sodium hydroxide of between about 1 to 0.5 and 1 to 0.9 simultaneously with propylene oxide and liquid methyl chloride, said propylene oxide being in a weight ratio of air-dry cellulose to propylene oxide of about 1 to 0.02 and 1 to 0.15 and said liquid methyl chloride being in a weight ratio of at least 4 parts for 1 part of air-dry cellulose.

Another object of the invention is the obtention of an adhesive composition comprising an aqueous solution of a water-soluble methyl hydroxypropyl ether of cellulose prepared from the reaction of a sodium cellulose having a weight ratio of air-dry cellulose to sodium hydroxide of between about 1 to 0.5 and 1 to 0.9 simultaneously with propylene oxide and liquid methyl chloride, said propylene oxide being in a weight ratio of air-dry cellulose to propylene oxide of about 1 to 0.02 and 1 to 0.15 and said liquid methyl chloride being in a weight ratio of at least 4 parts for 1 part of air-dry cellulose.

These and other objects of the present invention will become more apparent as the description thereof proceeds.

I have now discovered a process for the preparation of methyl hydroxypropyl ethers of cellulose, which cellulose ethers dissolve rapidly in water without forming lumps. This novel process is characterized in that simultaneously about 0.02–0.15 part by weight of propylene oxide and at least 4 parts by weight of liquid methyl chloride to 1 part by weight of air-dry cellulose are allowed to act upon sodium cellulose which has a weight ratio of air-dry cellulose to NaOH of between about 1 to 0.5 and 1 to 0.9 under pressure and at temperatures of between about 40° C. and 100° C. Subsequently, after removing the excess methyl chloride, the raw product is worked up in the usual manner.

As starting material any commercial cellulose may be used, as for example, beech cellulose, spruce cellulose, cotton linters or oat hull cellulose. The raw material may be used in the form of flakes or powder.

For the purpose of conversion into alkali cellulose the cellulose flakes may be contacted or dipped in the usual manner, for example, into an aqueous 30 to 50% sodium hydroxide solution; thereafter they may be pressed out to a "press coefficient" of 2.5 to 2.8. The term "press coefficient" usually means the ratio of weight of the saturated cellulose to that of the air-dry cellulose. If cellulose powder is to be used, the preparation of the alkali cellulose may be effected for example by spraying the aqueous sodium hydroxide solution onto the agitated cellulose powder.

The ratio of air-dry cellulose to NaOH in the sodium cellulose depends on the sodium hydroxide concentration as well as on the press coefficient. To 1 part by weight of air-dry cellulose about 0.5 to 0.9 part by weight, preferably 0.6 to 0.75 part by weight, of NaOH are preferred. The sodium cellulose is subsequently matured to the desired degree by air storaging in the usual manner.

For the reaction with methyl chloride and propylene oxide according to the critical process of the invention, these substances are allowed to act in liquid form on the matured alkali cellulose. For this purpose the propylene oxide may be dissolved in the methyl chloride beforehand, or it may simultaneously with or directly after supplying the methyl chloride, be fed into the reaction vessel. To 1 part of air-dry cellulose 0.02 to 0.15, in particular 0.025 to 0.1 part by weight of propylene oxide are used. The methyl chloride is to be reacted at an amount of at least 4 parts by weight, preferably of about 5 to 7 parts by weight, based on 1 part by weight of air-dry cellulose. The methyl chloride, which is consumed only partly, may also be used in larger amounts, for example up to about 12 parts by weight to 1 part by weight of air-dry cellulose. However, the process of the invention would prove thereby less economical. The propylene oxide used is consumed entirely in the reaction.

The process of the invention is preferably conducted at temperatures ranging between about 40° C. and 100° C. For practical reasons, after attaining about 40° C., the temperature is slowly increased to 80° C. to 90° C. After a period of about 3 to 7 hours, according to the capacity of the apparatus and range of temperature, the reaction is complete.

As the methyl chloride must be in liquid form during the reaction, the reaction is conducted in pressure vessels. Advantageously they are equipped with cooling devices, for example with a reflux cooler serving to eliminate the heat of reaction. For larger amounts of reactants, a reaction vessel with a pipe system can be used which is arranged so that the liquid methyl chloride can flow by means of a convection current through the alkali cellulose during the reaction. Of course the agitation of the liquid or even of the entire reaction mixture may be facilitated by other appropriate measures, for example by installations of pumps.

For the working up of the product, first of all the excess methyl chloride is removed. It is advantageous to discharge the methyl chloride in liquid form into a cooled pressure vessel. The recovered methyl chloride is sufficiently pure for further reactions after it has been separated from the aqueous phase. Any remaining methyl chloride is removed from the reaction mixture by evacuation or by being blown out with an inert gas.

Thereafter the raw product is worked up in the usual manner. For this purpose it is first washed with hot water having a temperature of about 70 to 100° C., particularly 85 to 95° C., to remove such by-product sodium chloride and methanol as had formed. Excess water is then eliminated by either centrifuging or filtering.

The moist raw product thus obtained, having a water content of about 50 to 70%, may be dried without further treatment. In this way, according to the starting material used, either a powdery or a fibrous product is obtained.

To convert the fibrous product into a granular to powdery material capable of trickling or being poured, it may be dried and ground up afterwards. It is however advantageous to homogenize the moist, fibrous methyl hydroxypropyl ether of cellulose in the customary manner, in an extrusion press and to press it into strands. These strands may be ground up for example in a hammer cage mill to a grain size (after drying) of 0.1 to 0.6 mm. The finely grained product thus obtained is then dried in a gas current, for example in a circulating air dryer, preferably to a water content of about 5 to 12%.

Furthermore it is advantageous to add small amounts of wetting agents to the methyl hydroxypropyl ethers of cellulose. This addition of wetting agents is done for example prior to the homogenization in the extrusion press. As wetting agents such well know anion-active or non-ionic compounds are considered as for example sodium lauryl sulfate, addition products of ethylene oxide to alkylphenols or fatty alcohols and others. With a relatively small addition of wetting agents, which, based on the air-dry cellulose ether, should amount to about 0.1% to 1.5% by weight, especially satisfactory and rapidly soluble products are obtained.

The methyl hydroxypropyl ethers of cellulose, prepared according to the invention, are notable for their excellent water miscibility and water solubility. By sprinkling the powdery or granular product into water and by light stirring, clear almost fiberless solutions are obtained within a short time. The aqueous solutions may be used as a glue or paste. For this purpose, aqueous compositions containing from 0.5% to 5% by weight of the methyl hydroxypropyl ethers of cellulose of the invention are preferably employed.

The following examples are illustrative of the practice of the invention. It is to be understood, however, that other expedients known to those skilled in the art may be employed and the specific embodiments are not to be deemed limitative.

Example 1

10 kg. of sulfite cellulose in form of flakes were dipped into an aqueous 35% sodium hydroxide solution and then pressed out (press coefficient=2.6). After seasoning for 18 hours at room temperature the flakes were roughly torn apart and placed in an autoclave of 150 liter capacity equipped with a reflux cooler. After being purged with nitrogen, 1 kg. of propylene oxide dissolved in 63 kg. of liquid methyl chloride were poured into the reaction vessel. The autoclave was heated to 60° C. within 1 hour, then heated to 85° C. within 2 more hours and this temperature was maintained for 1 hour. An atmospheric pressure of 22 atm. was obtained. After this reaction period the heating was discontinued and the excess liquid methyl chloride was discharged into a cooled pressure vessel. By vacuum evacuation of the autoclave the remaining methyl chloride was removed.

The product obtained was twice washed with water at 95° C. and then centrifuged. A portion of the product was dried, giving a white fibrous mass which dissolved in ice water to give a practically fiber-free, viscous solution. A 4% aqueous solution exhibited in the Brookfield viscosimeter (20 r.p.m.—spindle 3) a viscosity of 2600 cp.

The larger portion of the centrifuged material, still containing about 60% of water, was homogenized while cooling in a worm press and extruded in strands. These were cut up and crushed in a hammer mill. The material obtained was dried in a circulating air dryer to a water content of 9%. The size of the individual grains of the product ranged between 0.2 and 0.5 mm.

The granular methyl hydroxypropyl ether of cellulose thus obtained could be easily passed into solution in a short time without forming lumps by slightly stirring it into water at room temperature.

Example 2

850 kg. of cellulose (90% sulfite cellulose, 10% cotton linters) in the form of flakes were dipped into an aqueous 35% sodium hydroxide solution and then pressed out (press coefficient=2.6). After seasoning the sodium cellulose for 4 hours at room temperature, the flakes were coarsely broken up. Next, the pulverized sodium cellulose was filled into insertion baskets and placed into an autoclave of 10 m.³ capacity. The air was substituted by an atmosphere of nitrogen. Thereafter, 23 kg. of propylene oxide and 5000 kg. of liquid methyl chloride were charged into the autoclave. The autoclave was equipped with a reflux cooler. The insertion baskets caused the methyl chloride to flow through the sodium cellulose in a convection current. Within 2 hours the autoclave was heated to 62° C., in the following hour to 73° C. and in one more hour to 87° C. Then the heating was discontinued and the excess liquid methyl chloride was discharged into a cooled pressure vessel. The remaining methyl chloride was removed by vacuum evacuation.

Thereafter the product obtained was washed out with water at 90° C. and centrifuged. The fibrous mass, still containing about 70% of moisture was admixed with about 50 gm. of sodium laurylsulfate per every 10 kg. (based on the air-dry product) and was passed through a worm press. By cooling, the worm press was maintained at a temperature below 35° C. The jelly-like, homogeneous strand, extruded from the press, was cut up and ground in a hammer cage mill. The product obtained was dried in an air-circulating dryer to a final water content of about 10%. The grain size of the dried product was about 0.4 mm.

The methyl hydroxypropyl ether of cellulose dissolved in water without lumps within a few minutes under light stirring. A 1.7% solution had a viscosity of 3300 cp.

Example 3

10 kg. of spruce cellulose in form of flakes were immersed in an aqueous 39% sodium hydroxide solution and then pressed out (press coefficient=2.53). After seasoning for 18 hours at room temperature the flakes of sodium cellulose were coarsely pulled apart and placed in an autoclave having a capacity of 150 liters and equipped with a reflux cooler. After purging with nitrogen, 620 gm. of propylene oxide, dissolved in 69 kg. of liquid methyl chloride, were poured into the reaction vessel. The autoclave was heated within 1 hour to 63° C. and within 2 more hours to 83° C. and this temperature was maintained for 1 hour. An atmospheric pressure of 21 atm. was obtained. Thereafter, heating was discontinued and the excess liquid methyl chloride was discharged into a cooled pressure vessel. By vacuum evacuation the remainder of the methyl chloride was removed from the autoclave.

After washing twice with water having a temperature of 95° C. and after centrifuging, the product had a residual content of 60% of water. 50 gm. of a fatty alcohol polyethyleneglycolether were added and admixed thereto, and, while cooling, the product was extruded as a strand from a worm press. The strand was cut up and ground in a hammer cage mill. Thereafter the product obtained was dried in an air-circulating dryer to a water content of 8%.

The methyl hydroxypropyl ether of cellulose obtained dissolved in water at room temperature within a short period. A 2% solution had, at a temperature of 20° C., a viscosity of 3390 cp. (Höppler).

Example 4

10 kg. of cellulose (65% sulfite cellulose, 35% cotton linters) in the form of flakes were dipped into an aqueous 43% sodium hydroxide solution and pressed out (press coefficient=2.55). After seasoning for 3 hours at room temperature, the sodium cellulose was coarsely torn apart and placed in an autoclave of 150 liter capacity. After purging with nitrogen, 1.3 kg. of propylene oxide, dissolved in 68 kg. of liquid methyl chloride, were added thereto. Within 1 hour the reaction mixture was heated to 65° C., then to 86° C. for 4 hours. A pressure of 22 atm. was attained. After this period the excess liquid methyl chloride was discharged into a cooled pressure vessel. By means of vacuum evacuation the remaining methyl chloride was removed.

The product obtained was washed twice with water at 95° C. and then centrifuged. Subsequently the product was admixed with 25 gm. of a fatty alcohol polyethyleneglycolether, thoroughly mixed and extruded in a cooled worm press into strands, which then were cut up. After the product had been crushed in a mill to a grain size of about 0.2 to 0.5 mm., it was dried in the air-circulating dryer to an over-all water content of 9%.

The granular methyl hydroxypropyl ether of cellulose, prepared by this method, was easily dissolved within a short period without forming lumps, when it was dispersed in water of room temperature. A 2% aqueous solution had at a temperature of 20° C. a viscosity of 8230 cp. (Höppler).

The preceding specific embodiments are illustrative of the invention. It is obvious however that other expedients known to those skilled in the art may be employed in the practice of the invention without departing from the spirit of the invention or the scope of the appended claims.

I claim:
1. A process for the preparation of a methyl hydroxypropyl ether of cellulose which is readily soluble in water which comprises the steps of reacting sodium cellulose, having a weight ratio of air-dry cellulose to sodium hydroxide of between about 1 to 0.5 and 1 to 0.9 simultaneously with propylene oxide and liquid methyl chloride, said propylene oxide being utilized in a weight ratio of air-dry cellulose to propylene oxide of about 1 to 0.02 and 1 to 0.15 and said liquid methyl chloride being utilized in a weight ratio of at least 4 parts for 1 part of air-dry cellulose, under pressure sufficient to maintain said liquid methyl chloride at a temperature of between about 40° C. and 100° C., removing the excess methyl chloride and recovering said methyl hydroxypropyl ether of cellulose.

2. The process of claim 1, wherein in said sodium cellulose the ratio by weight of air-dry cellulose to sodium hydroxide is between 1 to 0.6 and 1 to 0.75.

3. The process of claim 1 wherein the ratio by weight of air-dry cellulose to propylene oxide is between 1 to 0.025 and 1 to 0.1.

4. The process of claim 1, wherein said liquid methyl chloride is present at an amount of 5 to 7 parts by weight for 1 part of air-dry cellulose.

5. The process of claim 1, wherein said methyl hydroxypropyl ether of cellulose is recovered by leaching the raw product with hot water, homogenizing the moist product, grinding the homogenized product and drying the ground product.

6. The process of claim 5, wherein said homogenized product is ground up to a grain size of between 0.1 and 0.6 mm. (after drying).

7. A process for the preparation of a methyl hydroxypropyl ether of cellulose which is readily soluble in cold water which comprises the steps of reacting sodium cellulose, having a weight ratio of air-dry cellulose to sodium hydroxide of between 1 to 0.6 and 1 to 0.75 simultaneously with a solution of propylene oxide in liquid methyl chloride, said propylene oxide being utilized in a weight ratio of air-dry cellulose to propylene oxide of 1 to 0.025 and 1 to 0.1 and said liquid methyl chloride being utilized in a weight ratio of 5 to 7 parts for 1 part of air-dry cellulose, in an inert atmosphere under pressure sufficient to maintain said liquid methyl chloride at a temperature of between about 40° C. and 100° C., removing the excess methyl chloride and recovering said methyl hydroxypropyl ether of cellulose.

8. The process of claim 7 wherein from about 0.1% to 1.5% by weight based on the air-dry cellulose ether of a wetting agent selected from the group consisting of anionic wetting agents and non-ionic wetting agents is added to said methyl hydroxypropyl ether of cellulose during said recovery step.

9. The process of claim 8 wherein said methyl hydroxypropyl ether of cellulose is recovered by leaching the raw product with water at a temperature between about 70° C. to 100° C., adding said wetting agent, homogenizing the moist product, grinding the homogenized product and drying the ground product.

References Cited

UNITED STATES PATENTS

| 2,840,485 | 6/1958 | Greminger et al. | 260—231 |
| 2,949,452 | 8/1960 | Savage | 260—231 |
| 2,978,343 | 4/1961 | Russo et al. | 106—197 |
| 3,342,805 | 9/1967 | Callihan | 260—231 |

ALLAN LIEBERMAN, Primary Examiner.

U.S. Cl. X.R.
106—170, 197